US008850794B2

(12) United States Patent
Daniau et al.

(10) Patent No.: US 8,850,794 B2
(45) Date of Patent: *Oct. 7, 2014

(54) PULSE DETONATION ENGINE

(75) Inventors: Emeric Daniau, St Florent sur Cher (FR); François Falempin, St Arnolt (FR); Etienne Bobo, Bourges (FR); Jean-Pierre Minard, Soye en Septaine (FR)

(73) Assignee: MBDA France, Paris (FR)

( * ) Notice: Subject to any disclaimer, the term of this patent is extended or adjusted under 35 U.S.C. 154(b) by 1022 days.

This patent is subject to a terminal disclaimer.

(21) Appl. No.: 12/988,604

(22) PCT Filed: Apr. 16, 2009

(86) PCT No.: PCT/FR2009/000440
§ 371 (c)(1),
(2), (4) Date: Oct. 19, 2010

(87) PCT Pub. No.: WO2009/133304
PCT Pub. Date: Nov. 5, 2009

(65) Prior Publication Data
US 2011/0030340 A1    Feb. 10, 2011

(30) Foreign Application Priority Data
Apr. 21, 2008 (FR) ...................... 08 02210

(51) Int. Cl.
*F02K 7/06* (2006.01)
*F02K 5/02* (2006.01)
*F23R 7/00* (2006.01)
*F02B 71/06* (2006.01)
*F02K 7/075* (2006.01)
*F02K 7/02* (2006.01)

(52) U.S. Cl.
CPC ............... *F02B 71/06* (2013.01); *Y02T 50/672* (2013.01); *F02K 7/075* (2013.01); *F02K 7/06* (2013.01); *F02K 7/02* (2013.01)
USPC ............................................ 60/247; 60/39.76

(58) Field of Classification Search
CPC ................. F02K 7/06; F02K 5/02; F23R 7/00
USPC .......... 60/247, 39.38, 39.76, 39.23; 137/15.1, 137/15.2, 767
See application file for complete search history.

(56) References Cited

U.S. PATENT DOCUMENTS 1,387,450 A * 8/1921 Caldwell ........................ 431/353
2,637,974 A * 5/1953 Nathan ............................ 60/224

(Continued)

FOREIGN PATENT DOCUMENTS

FR    1 076 384 A    10/1954

OTHER PUBLICATIONS

Written Opinion of the International Searching Authority, European Patent Office, for International Application No. PCT/FR2009/000440.

*Primary Examiner* — Ehud Gartenberg
*Assistant Examiner* — Vikansha Dwivedi
(74) *Attorney, Agent, or Firm* — Novak Druce Connolly Bove + Quigg LLP

(57) ABSTRACT

According to the invention, the said engine (I), which comprises at least one flame tube (2) with a mobile transverse end wall (18), comprises an external envelope (3) around the said flame tube (2), which defines a peripheral annular space (4) in which fixed flow guides (11, 12, 13, 14) are positioned, these flow guides forming flow channels (10) for the air, and at least one mobile plug (25), connected to the said mobile end wall (18), to close off and open one of the flow channels (10).

12 Claims, 4 Drawing Sheets

(56) References Cited

U.S. PATENT DOCUMENTS 6,349,538 B1 * 2/2002 Hunter et al. .................. 60/204
7,131,260 B2 11/2006 Dean et al.
7,464,534 B2 * 12/2008 Daniau ....................... 60/39.76
2006/0254252 A1 11/2006 Rasheed et al.
2007/0180810 A1 8/2007 Chapin et al.
2011/0088370 A1 * 4/2011 Daniau et al. .................. 60/247

* cited by examiner

PULSE DETONATION ENGINE

CROSS-REFERENCE TO RELATED APPLICATIONS

This application is a §371 national stage entry of International Application No. PCT/FR2009/000440, filed Apr. 16, 2009, which claims priority to French patent application Ser. No. 08/02210, filed Apr. 21, 2008, the entire contents of which are incorporated herein by reference.

FIELD OF THE INVENTION

The present invention relates to a pulse detonation engine with a fuel-air detonating mixture.

BACKGROUND OF THE INVENTION

Such a type of engine is applicable, amongst others, although not exclusively, in the spatial and military aeronautical fields for the equipment of aircrafts, rockets, missiles, etc.

The operating cycle of such an engine could be reduced to the three following strokes:
 a first stroke relating to the engine supplying phase with a detonating mixture;
 a second stroke relating to the detonating phase providing the compression and the release of the chemical energy generated by the mixture; and
 a third stroke relating to the expansion phase of the detonating products.

The running of the different phases of the operating cycle of the engine is a potentially critical point and, in particular, the control of the supply and detonation phases being able to very strongly impact on the performance of such an engine.

It is already known from patent EP 1,482,162 a pulse detonation engine, the structure of which is defined by a flame tube closed at one end by a mobile transversal bottom (referred to as a thrust wall) where products generated by the detonation of the detonating mixture abut in order to generate the thrust. Such an engine requires the operation of both supply and detonation phases of the engine, through the mobility thereof, opening and closing the intake port, allowing to be dispensed with complex valve supply devices or the like.

SUMMARY OF THE INVENTION

The aim of the present invention is to improve the above mentioned pulse detonation engine, minimizing, during the detonation phase, blocking the air flow from the air intake so as to limit the drag generated by the air intake.

To this end, according to the invention, the pulse detonation engine operating with a fuel-air detonating mixture and comprising:
 at least one flame tube with a transversal bottom being mobile with respect to the latter so as to be able to occupy two limit positions, a first position corresponding to the detonation phase of the detonating mixture in the combustion chamber and a second position corresponding to the supply phase of said chamber;
 at least one intake port for the detonating mixture arranged in the side wall of said flame tube;
 is remarkable in that:
 said engine comprises an external shell around said flame tube defining a peripheral ring space along the side wall of said flame tube, enabling the air flow from the air intake of said engine;
 fixed flow guides are arranged in the peripheral ring space in order to define air flow channels in such a space, and
 at least one mobile block arranged in the ring space and connected to said mobile bottom, is provided for moving along the side wall of said flame tube, said mobile block being able to obstruct, when said mobile bottom occupies the second position, one of said flowing channels so as to orient part of the air flow towards said intake port and release said flowing channel when said bottom is in the first position.

Thus, through the invention, blocking the air flow coming from the air intake is minimized during the detonation phase since the air flow can circulate in the flowing channels of the ring space, bypassing the mobile blocks when the intake port(s) is/are obstructed, resulting in the drag generated by the air intake being limited.

Moreover, the engine can be dispensed with complex controlling devices of the mobile block(s), since it is the transversal bottom that requires the mobile blocks to be moved as a result of its mobility.

The structure of the engine also allows a cylindrical nozzle, for example, of the ejecting type, being concentric with the combustion chamber to be supplied and thereby benefit from the advantages of a double flow engine.

Advantageously, said fixed guides could be arranged parallel to each other in a concentric way around the side wall of said flame tube. Thereby, the flowing channels of the ring space are parallel to each other, facilitating the air flow, upon the detonation phase, along the side wall of the flame tube.

For example, the shift of said mobile block could be a side sliding along the side wall of said flame tube.

Moreover, said mobile block could advantageously join the external face of the ends opposite the two adjacent fixed guides so as to obstruct the flowing channel partially formed by those two fixed guides, when said mobile bottom occupies the second position.

In addition, said mobile bottom, sliding between the first and the second position, could advantageously have the shape of a piston with its transversal wall facing said chamber and with a side skirt cooperating with the wall of said flame tube, and a crown, comprising at least one detonating mixture supply opening, could then be integral with the transversal wall of said piston and cooperate with the side wall of said flame tube for obstructing at least partially said intake port in the second position of said mobile bottom.

Preferably, at least one first intake port, having a flowing hole with a fixed section, is obstructed in the first position of said mobile bottom and released in the second position of said bottom and at least one second intake port, able to receive a mobile projection, has a flowing hole with a variable section, said hole having a section being reduced in the first position of said mobile bottom and a section being enlarged in the second position of said bottom.

Said pulse detonation engine could advantageously comprise at least one predetonation tube arranged laterally with respect to said combustion chamber, at least approximately along the latter, making easier the air and fuel supply of the pre-detonation tube(s).

Moreover, a mobile projection could be engaged into said second opening and join the internal face of the ends of one of said fixed guides, when said mobile bottom occupies the first position, so as to form a transversal passage putting in a fluid communication said pre-detonation tube and said combustion chamber for allowing, more particularly, the transfer of the explosion waves, and one of the ends of said transversal passage then corresponds to said flowing hole of said second intake port having a reduced section, when said mobile bottom occupies the first position, and the other end corresponds to the upstream hole, oriented to the air intake, of said pre-detonation tube.

In an advantageous embodiment of the present invention, the pulse detonation engine comprises a plurality, at least two, of pre-detonation tubes in diametrically opposed side positions with respect to said combustion chamber. Thus, the engine is far more robust than a single pre-detonation tube engine, more particularly substantially improving the propagation of the detonation in the chamber.

According to another advantageous feature, at least one of said fixed guides could have the shape of a fork with teeth oriented to the air intake so as, upon the supply phase, to orient the air flow towards one or more released intake ports.

Moreover, return resilient means are provided in said flame tube for bringing back said mobile bottom from the first position to the second position. Such return resilient means comprise, for example, at least one spring acting on the transversal wall of said bottom.

BRIEF DESCRIPTION OF THE DRAWINGS

The figures of the appended drawing will better explain how this invention can be implemented. In these figures, like reference numerals relate to like components

DETAILED DESCRIPTION

Figure 1:
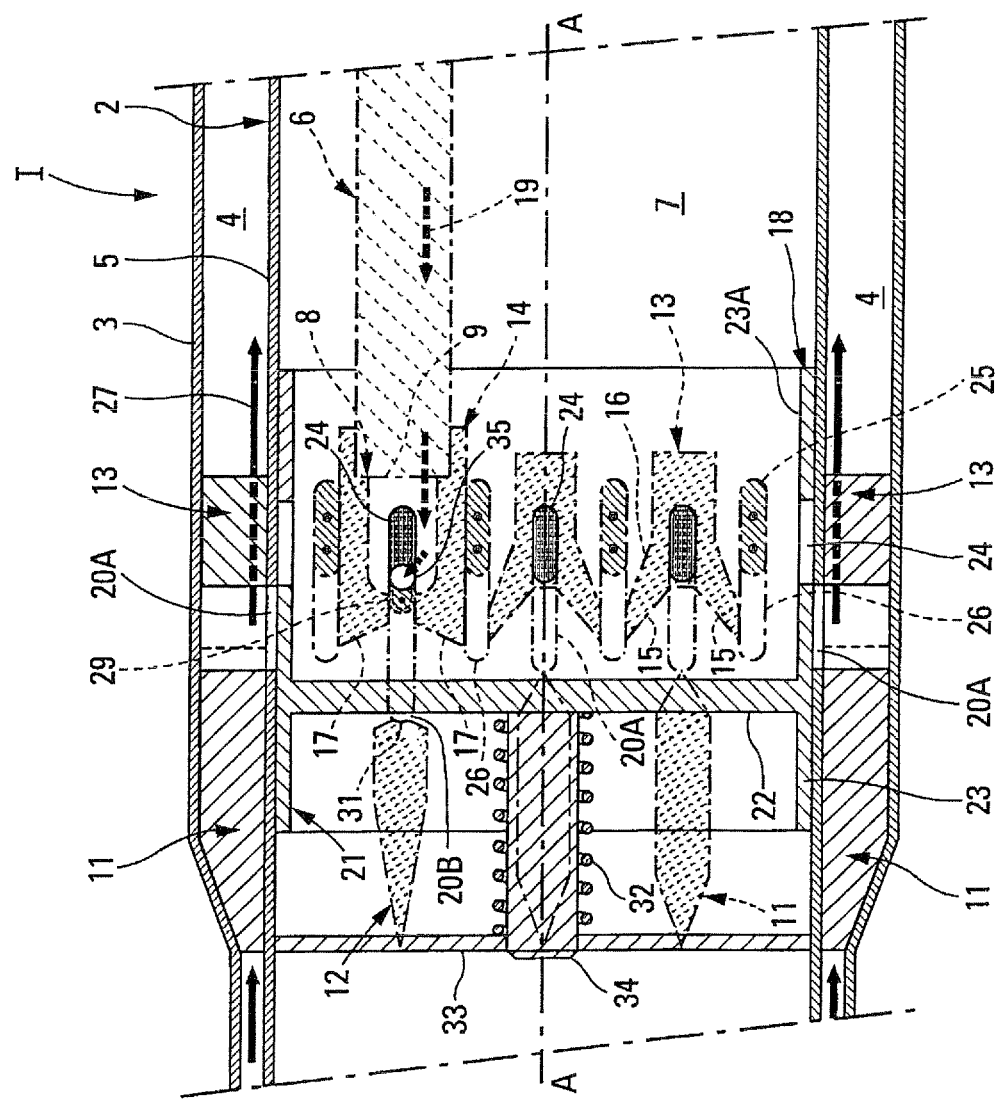
FIG. 1 is a close-up schematic view in a longitudinal section of an exemplary embodiment of the pulse detonation engine according to this invention, showing the mobile bottom in the first position. For clarity reasons, the mobile blocks, the mobile projection, the guiding openings and the intake port, concealed behind the piston crown, are shown in a close-up detailed view in broken lines. The fixed guides and the pre-detonation tube, concealed by the side wall of the flame tube are, as far as they are concerned, shown in phantom lines.
Figure 2:
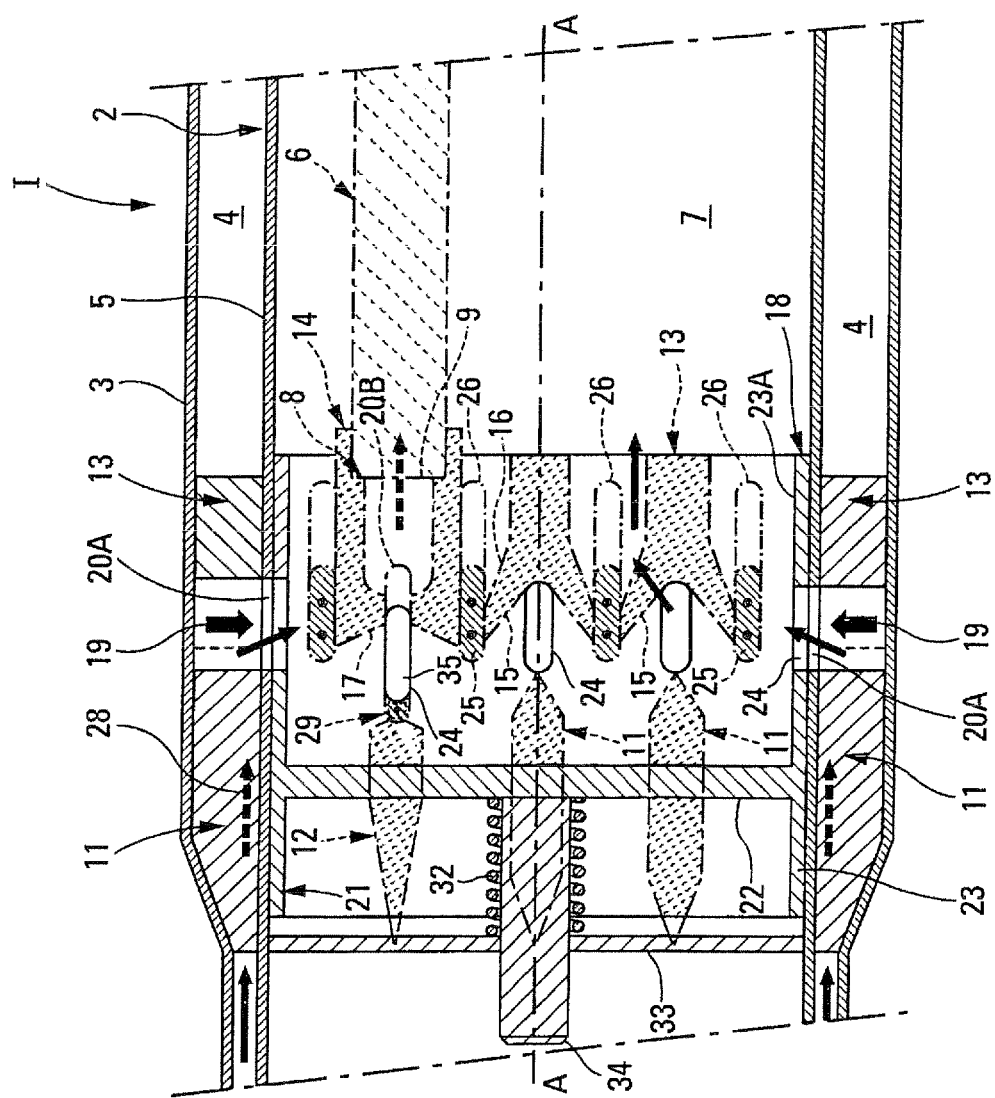
FIG. 2 is a view like FIG. 1 showing the mobile bottom in the second position.

According to a preferred embodiment of this invention, the pulse detonation engine, schematically and partially shown on FIGS. 1 and 2, comprises a cylindrical flame tube 2 with a longitudinal axis A and an external shell 3 covering the flame tube 2 and defining a peripheral ring space 4 along the side wall 5 of said tube 2.

Moreover, the engine I comprises, in such a preferred embodiment, two pre-detonation tubes 6, but the number thereof could be different, arranged laterally with respect to the combustion chamber 7 of the flame tube 2, in diametrically opposed positions with respect to the latter. In such an embodiment, the front end 8, oriented to the air intake, of the pre-detonation tubes 6 (on the left on FIGS. 1 and 2) opens into the peripheral ring space 4 through a hole 9, whereas the downstream end of said tubes 6 (not shown on the figures) opens into the outside. Each pre-detonation tube 6 could comprise a central priming device (not shown on the figures) allowing the pressure to be maintained for a sufficiently long period at the level of the front end 8 of the tube 6 after an explosion.

Figure 3:
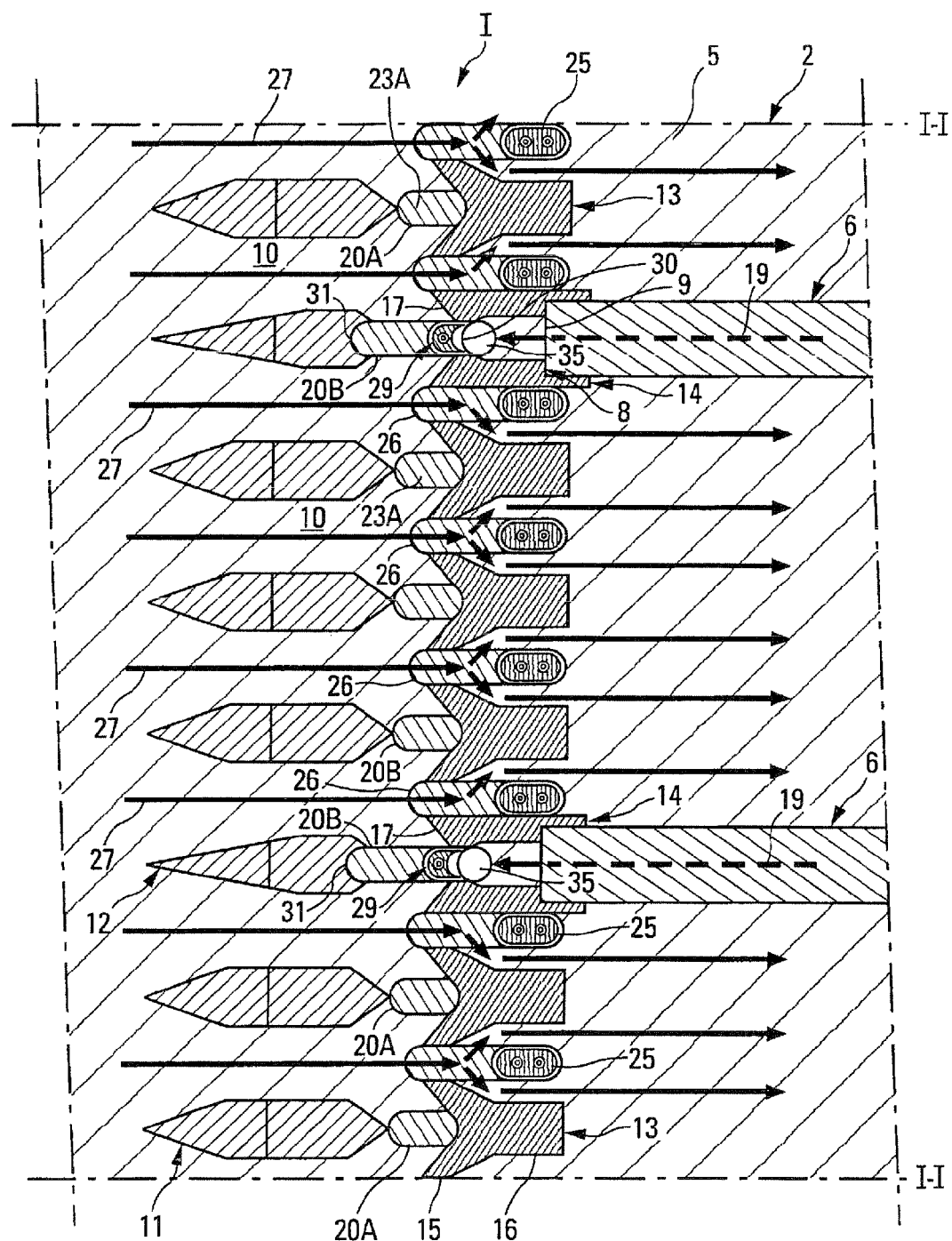
FIGS. 3 and 4 schematically show a detailed view of the external side surface of the flame tube, respectively in the first and second positions of the mobile bottom.
Figure 4:
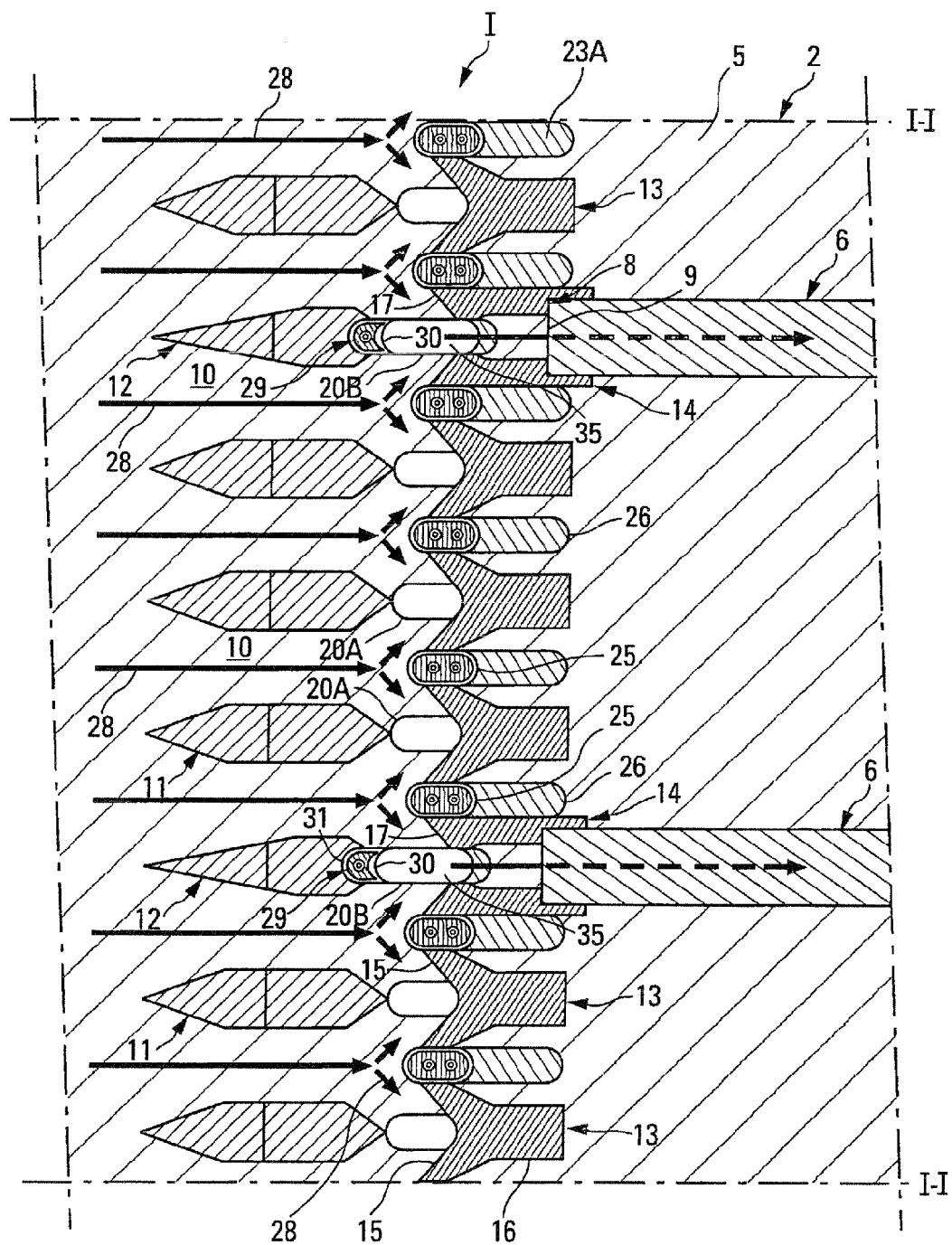

Moreover, according to the invention and as shown on FIGS. 3 and 4, flowing guides 11, 12, 13 and 14 are fastened, preferably in a concentric manner, to the side wall 5 of the flame tube 2 in the ring space 4 so as to form, in such a space, parallel flowing channels 10 along the flame tube 2. Each flowing channel 10 is for example bounded by two guide pairs, one guide pair comprising a downstream guide 13 or 14 (on the right on FIGS. 3 and 4) and an associated upstream guide 19 or 12 (on the left on the same figures). According to such a preferred embodiment, some downstream guides 13, referred to as first guides, could have the shape of a fork 16 with two teeth 15 facing the associated upstream guide 11, referred to as the third guide. Other downstream guides 14, referred to as second guides, more particularly intended for being arranged before the upstream hole 9 of the pre-detonation tubes 6, could comprise two parallel independent branches 17 having their projecting ends being oriented towards the associated upstream guide 12 referred to as the fourth guide.

The engine I also comprises a transversal bottom 18 fittingly housed inside the flame tube 2. Such a transversal bottom 18 bounds, with the side wall 5 of the flame tube 2, the combustion chamber 7 able to cyclically receive a fuel load, symbolized by the arrow 19 on FIG. 2, coming out of a supply device, present in the ring space but not shown on the figures, supplying the fuel-air detonating mixture. The transversal bottom 18 defines a thrust wall against which the detonation products of the detonating mixture apply for generating the thrust.

According to the preferred embodiment, the transversal bottom 18 is mounted being mobile, but not exclusively, with respect to the flame tube 2 of the engine I and could move between two distinct limit positions, a first position (FIGS. 1 and 3) isolating the combustion chamber 7 from the peripheral ring space 4, corresponding to the detonation phase of the detonating mixture, and a second position (FIGS. 2 and 4) putting in fluid communication the combustion chamber 7 and the peripheral ring space 4, corresponding to the supply phase of the chamber with detonating mixture.

To this end, first ports 20A for the intake of the detonating mixture in the chamber 7, having a flowing hole with a fixed section, are arranged in the side wall 5 of the flame tube 2, advantageously between the teeth 15 of the first guides 13, said first intake ports 20A being fully obstructed when the mobile transversal bottom 18 is in its first position, and released when it occupies its second position.

Second intake ports 20B are also provided in the side wall 5 of the flame tube 2 between the branches 17 of the second guides 14. Such second intake ports 20B have the feature of having a fluid flowing hole 35 with a variable section, said flowing hole 35 having a reduced section in the first position of the mobile bottom 18, allowing the transfer of the explosion waves from the pre-detonation tubes 6 to the combustion chamber 7 through a transversal passage (to be further described subsequently) and an enlarged section in the second position of the mobile bottom 18, for allowing for the supply with detonating mixture of the combustion chamber 7 and the pre-detonation tubes 6.

As shown on FIGS. 1 and 2, moving the mobile bottom 18 between its two positions is, in such a preferred embodiment, of the sliding type according to the longitudinal axis A, but it could be different (for example of the helical type).

In the shown embodiment, the mobile bottom 18 has structurally the shape of a piston 21 comprising a transversal wall 22 facing the combustion chamber 7 with a side skirt 23 fittingly cooperating with the side wall 5 of the flame tube 2. The mobile bottom 18 further comprises a crown 23A being integral with the transversal wall 22 of the piston 21 and fittingly cooperating with the side wall 5 of the flame tube 2 for fully obstructing the first intake ports 20A and partially the second intake ports 20B having a flowing hole 35 with a reduced section, when the mobile bottom 18 occupies the second position.

Side supply openings 24 are provided in the side wall of the crown 23A of the piston 21. Such supply openings 24 communicate with the first 20A and second 20B intake ports, when the mobile bottom 18 occupies the second position, for putting in fluid communication the ring space 4 and the combustion chamber 7 upon the supply phase.

Moreover, according to the invention, mobile blocks 25 are arranged inside the flowing channels 10 between the first 13 and second 14 guides and are fastened, preferably in a concentric manner, to the crown 23A of the piston 21. Such mobile blocks are provided, according to the invention, for laterally sliding in guiding openings 26 provided in the side wall 5 of the flame tube 2, but other types of shift of the blocks 25 could be contemplated. Thereby, as shown on FIG. 3, each mobile block 25 is offset, to the right on FIG. 3, with respect to the ends of the teeth 15 of the first guides 13 and of the branches 17 of the second guides 14, when the mobile bottom 18 occupies the first position, so that the air flow of the air intake, symbolized by the arrow 27, is able to circulate freely in the flowing channels 10 along the wall of the flame tube 2, bypassing the mobile blocks 25.

As illustrated on FIG. 4, the mobile blocks 25 fittingly join the external face of the ends opposite the teeth 15 and the branches 17, when the mobile bottom 18 occupies the second position, so as to obtain the flowing channels 10 and orient the air flow of the air intake, symbolized by the arrow 28 on FIGS. 2 and 4, in the direction of the first released intake ports 20A and of the enlarged section flow hole 35 of the second intake ports 20B.

Furthermore, the mobile projections 29, being indented on their downstream side face 30, are fastened to the crown 23A of the piston 21 and can slide, preferably parallel to the mobile block 25, in the second intake ports 20B adjacent to the pre-detonation tubes 6. As illustrated on FIG. 3, the mobile projections 29 fittingly join the internal face of the ends of the opposite branches 17, in the first position of the mobile bottom 18, and thereby define a transversal passage allowing the transfer of the explosion wave from the pre-detonation tubes 6 to the combustion chamber 7, one of the ends of the transversal passage corresponding to the reduced section flowing hole 35 and the other end to the upstream hole 9 of the pre-detonation tubes 6.

A housing 31 is provided on the downstream side face of the fourth guides 12, being arranged opposite the pre-detonation tubes 6, for receiving the mobile projections 29, when the mobile bottom 18 is in the second position.

In addition, return resilient means are provided between the transversal mobile bottom 18 and the flame tube 2, for spontaneously bringing said bottom 18 from its second position (FIG. 2) back to its first position (FIG. 1). For example, such means are merely defined by a compression spring 32 arranged between the upstream face of the transversal wall 22 of the piston 21 opposite the combustion chamber 7, and a transversal abutment 33 provided in the flame tube 2. Usually, a guiding rod 34 of the spring 32 fastened to the upstream face of the transversal wall of the piston 21 could be associated with said spring 32.

The operating cycle of such a pulse detonation engine I as described above is as follows.

First of all, it is assumed that the engine I is in the configuration, as illustrated on FIGS. 1 and 3, for which the mobile transversal bottom 18 is in its first position, that is:

the mobile blocs 25 are offset to the right on FIG. 3 so as to allow the air flow to circulate along the side wall 5 of the flame tube 2;

the mobile projections 29 join the internal face of the ends of the branches 17 opposite the second guides 14 so as to form the transversal passages allowing the fluid communication between the pre-detonation tubes 6 and the combustion chamber 7. The pre-detonation tubes 6 are thereby separated from the detonating mixture input; and the first intake ports 20A are fully obstructed by the side wall of the crown 23A so that the combustion chamber 7 is isolated from the detonating mixture input.

Under the impulsion of the explosion waves generated in the pre-detonation tubes 6 and of the transmission thereof via the transversal passages, the detonation of the compressed reactive mixture occurs in the chamber 7. As the pressure strongly increases in the chamber 7, the mobile bottom 18 starts to move to the back (to the left on FIG. 1) simultaneously resulting in the first intake ports 20A opening, the section of the hole 35 of the second intake ports 20B enlarging and the mobile blocks 25 sliding, to the ends of the teeth 15 and branches 17, and the mobile projections 29, to the housings 31 of the fourth guides 12.

The pressure in the combustion chamber 7 is temporarily dropped under the effect of the rear expansion of the detonation products, but under the effect of the inertia thereof and the acquired velocity, the piston 21 goes on moving back against the spring 32 until the mobile bottom 18 reaches its second position.

When the mobile bottom 18 occupies the second position, the first released intake ports 20A and the second intake ports 20B, having its hole 35 with an enlarged section, communicate with the supply openings 24 of the crown 23A. Moreover, the mobile blocks 25 obstruct the flowing channels 10 joining the external face of the ends of the opposite teeth 15 and branches 17 and the mobile projections 29 are in abutment in their respective housing 31, Afterwards, a self-sucking phenomenon, resulting from the depression caused by the overexpansion of the detonation products, allows the autonomous filling of the combustion chamber 7 and the pre-detonation tubes 6 with a detonating fuel-air mixture.

Then, under the action of the compression spring 32, the mobile bottom 18 is sent back to the combustion chamber 7, the crown 23A of the piston 21 fully obstructing the first intake ports 20A and partially the second intake ports 20B, the hole 35 thereof having a reduced section, whereas the mobile blocks 25 are in abutment with the guiding openings 26 and the mobile projections 29 join the internal face of the ends of the opposite branches 17.

A new operating cycle of the engine I can then start.

The invention claimed is:

1. A pulse detonation engine operating with a detonating fuel-air mixture and comprising:
    at least one flame tube with a transversal bottom being mobile with respect to the transversal bottom so as to be able to occupy two limit positions, a first position corresponding to detonation phase of the detonating fuel-air mixture in a combustion chamber of said at least one flame tube and a second position corresponding a supply phase of said combustion chamber;
    at least one intake port of the detonating mixture arranged in a side wall of said at least one flame tube;
wherein:
    said pulse detonation engine comprises an external shell around said flame tube defining a peripheral ring space along the side wall of said flame tube allowing an air flux to flow from an air intake of said pulse detonation engine;

fixed flowing guides are arranged in the peripheral ring space to define flowing channels; and at least one mobile block arranged in the peripheral ring space and connected to a mobile bottom, is provided for moving along the side wall of said at least one flame tube, said mobile block being able to obstruct, when said mobile bottom occupies the second position, at least one of said flowing channels so as to orient part of the air flow in the direction of said at least on intake port and release said at least one of said flowing channels when said mobile bottom is in the first position.

2. The pulse detonation engine according to claim 1: wherein said fixed flowing guides are arranged parallel to each other in a concentric way around the side wall of said at least one flame tube.

3. The pulse detonation engine according to claim 1, wherein said at least one mobile block sides laterally along the side wall of said flame tube.

4. The pulse detonation engine according to claim 1, wherein said at least one mobile block joins an external face of ends opposite two adjacent fixed flowing guide so to obstruct a flowing channel partially formed by the two adjacent fixed flowing guides, when said mobile bottom occupies the second position.

5. The pulse detonation engine according to claim 1, wherein;

said mobile bottom, sliding between the first position and the second position, has a shape of a piston with a transversal wall facing said combustion chamber and with a side skirt cooperating with the side wall of said at least one flame tube; and a crown, comprising at least one detonating mixture supply opening arranged on a side wall of the crown, the crown being integral with the transversal wall of said piston and cooperating with the side wall of said at least one flame tube for obstructing at least partially said at least one intake port in the second position of said mobile bottom.

6. The pulse detonation engine according to claim 1, wherein:

at least one first intake port, having a flowing hole with a fixed section, is obstructed in the first position of said mobile bottom and released in the second position of said bottom; and at least one second intake port, able to receive a mobile projection, and having a flowing hole with a variable section, said hole having a reduced section in the first position of said mobile bottom and an enlarged section in the second position of a id bottom.

7. The pulse detonation engine according to claim 6, comprising at least one pre-detonation tube arranged laterally relative to said combustion chamber, at least approximately along the combustion chamber, wherein:

a mobile projection is engaged into said second intake port;

said mobile projection joins the internal face of the ends of one of said fixed flowing guides, when said mobile bottom occupies the first position, so as to form a transversal passage putting in fluid communication said at least one pre-detonation tube and said combustion so as to allow transfer of explosion waves; and one of the ends of said transversal passage corresponds said flowing hole of said second intake port having a reduced section, when said mobile bottom occupies the first position, and the other end corresponds to the upstream hole, oriented to the air intake, of said pre-detonation tube.

8. The pulse detonation engine according to claim 1, comprising at let one pre-detonation tube arranged laterally relative to said combustion chamber, at least approximately along the combustion chamber.

9. The pulse detonation engine according to claim 1, comprising a plurality, at least two, of pre-detonation tubes in lateral positions diametrically opposed with respect to said combustion chamber.

10. The pulse detonation engine according to claim 1, wherein at least one of said fixed guides is shaped as a fork with teeth oriented to the air intake.

11. The pulse detonation engine according to claim 1, wherein return resilient means are provided in said flame tube for bringing back said mobile bottom from the first position to the second position.

12. The pulse detonation engine according to claim 11: wherein said return resilient means comprise at least one spring acting on the transversal wall of said bottom.

\* \* \* \* \*